United States Patent
Viggiani et al.

(10) Patent No.: US 11,433,412 B2
(45) Date of Patent: Sep. 6, 2022

(54) ROBOTIC TREATMENT SYSTEMS AND METHODS FOR PROVIDING AUTOMATED COMPONENT TREATMENT

(71) Applicant: General Electric Company, Schenectady, NY (US)

(72) Inventors: James Viggiani, Fountain Inn, SC (US); Stanley Frank Simpson, Simpsonville, SC (US); Travis Edgar Garner, Travelers Rest, SC (US)

(73) Assignee: General Electric Company, Schenectady, NY (US)

( * ) Notice: Subject to any disclaimer, the term of this patent is extended or adjusted under 35 U.S.C. 154(b) by 377 days.

(21) Appl. No.: 16/451,353

(22) Filed: Jun. 25, 2019

(65) Prior Publication Data
US 2020/0406283 A1  Dec. 31, 2020

(51) Int. Cl.
*B05B 13/04* (2006.01)
*B05B 15/652* (2018.01)
(Continued)

(52) U.S. Cl.
CPC ........ *B05B 13/0431* (2013.01); *B05B 15/652* (2018.02); *B23K 10/00* (2013.01); *H05H 1/3405* (2013.01)

(58) Field of Classification Search
CPC .............. B05B 15/652; B05B 13/0431; H05H 1/3405; B25J 11/0075; B25J 15/0019; B25J 15/04; B23K 10/00
See application file for complete search history.

(56) References Cited

U.S. PATENT DOCUMENTS

| | | | |
|---|---|---|---|
| 4,445,021 A | | 4/1984 | Irons et al. |
| 4,944,459 A | * | 7/1990 | Watanabe ........... B05B 12/1472 239/305 |

(Continued)

FOREIGN PATENT DOCUMENTS

| | | | |
|---|---|---|---|
| JP | 05200334 A | * | 8/1993 |
| JP | 2007222754 A | * | 9/2007 |
| JP | 2017047345 A | | 3/2017 |

OTHER PUBLICATIONS

International Patent Application No. PCT/US2020/036760; International Search Report; dated Sep. 25, 2020; (3 pages).

*Primary Examiner* — Yuechuan Yu
(74) *Attorney, Agent, or Firm* — Dority & Manning, P.A.

(57) ABSTRACT

A robotic treatment system includes a robotic arm comprising a tool mount, and a plurality of tools, each of the plurality of tools removably connectable to the tool mount. The system further includes a distribution assembly, which includes a distribution source, a distribution feed cable, a distribution return cable, and a plurality of distribution valves. Each of the plurality of distribution valves regulates a distribution flow through the distribution feed cable to one of the plurality of tools or the distribution return cable from one of the plurality of tools. The system further includes a supply assembly, which includes a supply controller, a plurality of substrate feeders, and a plurality of supply feed cables. The system further includes a main controller, the main controller in operable communication with the robotic arm, the supply controller, and each of the plurality of distribution valves.

19 Claims, 3 Drawing Sheets

(51) Int. Cl.
*B23K 10/00* (2006.01)
*H05H 1/34* (2006.01)

(56) References Cited

U.S. PATENT DOCUMENTS

| | | | |
|---|---|---|---|
| 6,068,090 | A | 5/2000 | Chen et al. |
| 6,390,383 | B1 | 5/2002 | Fusaro, Jr. |
| 9,272,360 | B2 | 3/2016 | Albanese et al. |
| 2003/0233979 | A1* | 12/2003 | Tefft .................. B05B 7/205 |
| | | | 118/679 |
| 2011/0049110 | A1 | 3/2011 | Lochner et al. |
| 2014/0263204 | A1* | 9/2014 | Albanese ............ B05B 13/0431 |
| | | | 219/121.51 |
| 2015/0328655 | A1 | 11/2015 | Reichler |

\* cited by examiner

ROBOTIC TREATMENT SYSTEMS AND METHODS FOR PROVIDING AUTOMATED COMPONENT TREATMENT

FIELD

The present disclosure relates generally to robotic treatment systems and methods for providing automated component treatment.

BACKGROUND

Robotic arms are utilized in a wide variety of industries for treating various industry components. For example, in the power generation field, robotic arms are utilized for a wide variety of purposes including, for example, thermal coating applications and/or welding applications. In particular, various components, such as turbine blades and nozzles, may require certain outer coatings that may be applied by equipment coupled to a robotic arm. For example, some such components may require a thermal barrier coating, and may further require a bond coating that bonds with and between the thermal barrier coating and the component.

In many cases, component treatment is a multi-step process using multiple different materials and tools. For example, in the context of power generation components, the bond coating is formed from a first material and applied using a first tool, while the thermal barrier coating is formed from a second material and applied using a second tool.

Currently, only two options are available for treatment applications that involve multiple materials and/or tools. One option is to utilize a single robotic arm (which is all that is available in many treatment shops) and manually change out the materials and tools. In addition to removal of the first tool and installation of the second tool, such manual change further requires additional calibration procedures every time a change is made, and is thus a very time-intensive process. The other option is to utilize a multiple-robotic arm system. However, such systems may occupy more floor space and are typically cost-prohibitive.

Accordingly, improved methods and apparatus for providing automated component treatment, in particular when multiple materials and/or tools are required, would be desired.

BRIEF DESCRIPTION

Aspects and advantages of the robotic treatment systems and methods in accordance with the present disclosure will be set forth in part in the following description, or may be obvious from the description, or may be learned through practice of the technology.

In accordance with one embodiment, a robotic treatment system is provided. The system includes a robotic arm comprising a tool mount, and a plurality of tools, each of the plurality of tools removably connectable to the tool mount. The system further includes a distribution assembly, which includes a distribution source, a distribution feed cable, a distribution return cable, and a plurality of distribution valves. Each of the distribution feed cable and distribution return cable is in communication between the distribution source and each of the plurality of tools. Each of the plurality of distribution valves regulates a distribution flow through the distribution feed cable to one of the plurality of tools or the distribution return cable from one of the plurality of tools. The system further includes a supply assembly, which includes a supply controller, a plurality of substrate feeders, and a plurality of supply feed cables, each of the plurality of supply feed cables in communication between one of the plurality of substrate feeders and one of the plurality of tools. The system further includes a main controller, the main controller in operable communication with the robotic arm, the supply controller, and each of the plurality of distribution valves.

In accordance with another embodiment, a method for providing automated component treatment is provided. The method includes commanding, with a main controller, a robotic arm to connect to one of a plurality of tools. The method further includes operating, with the main controller, one or more of a plurality of distribution valves such that only the ones of the plurality of distribution valves in communication with the one of the plurality of tools are open. Each of the plurality of distribution valves regulates a distribution flow through a distribution feed cable from a distribution source to one of the plurality of tools or through a distribution return cable from one of the plurality of tools to the distribution source. The method further includes directing, with the main controller, a supply controller to provide a supply feed flow through only one of a plurality of supply feed cables. The one of the plurality of supply feed cables is in communication with the one of the plurality of tools. The method further includes commanding, with the main controller, the robotic arm to disconnect from the one of the plurality of tools and connect to another one of the plurality of tools. The method further includes operating, with the main controller, one or more of the distribution valves such that only the ones of the plurality of distribution valves in communication with the other one of the plurality of tools are open. The method further includes directing, with the main controller, the supply controller to provide a supply feed flow through only the one of the plurality of supply feed cables which is in communication with the other one of the plurality of tools.

These and other features, aspects and advantages of the present robotic treatment systems and methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION

A full and enabling disclosure of the present robotic treatment systems and methods, including the best mode of making and using the present systems and methods, directed to one of ordinary skill in the art, is set forth in the specification, which makes reference to the appended figures, in which.

DETAILED DESCRIPTION

Figure 1:
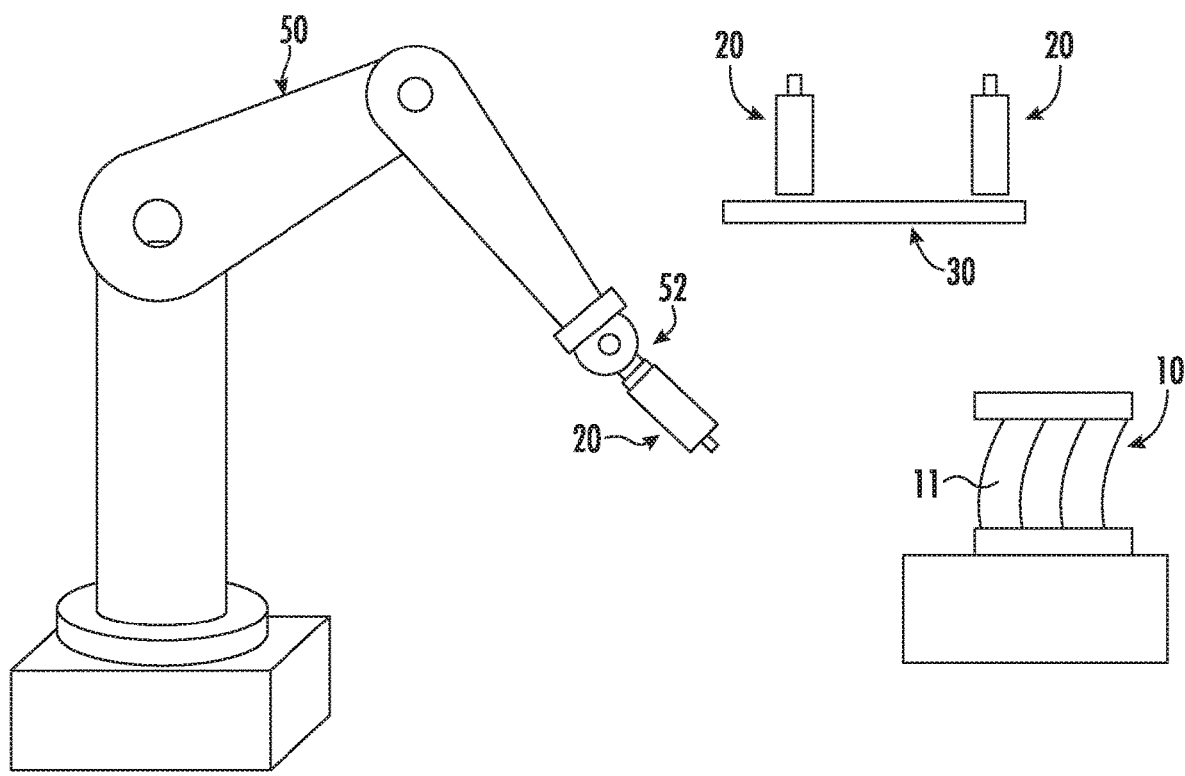
FIG. 1 illustrates components of a robotic treatment system, in accordance with embodiments of the present disclosure.

Reference now will be made in detail to embodiments of the present robotic treatment systems and methods, one or more examples of which are illustrated in the drawings. Each example is provided by way of explanation, rather than limitation of, the technology. In fact, it will be apparent to those skilled in the art that various modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

Referring now to FIGS. 1 through 4, the present disclosure is generally directed to improved robotic treatment systems and methods for providing automated component treatment. One particular advantage of some embodiments of the present disclosure is the use of such systems and methods in retrofit situations. For example, in many cases, as discussed above, a treatment shop may already have a single robotic arm, which is utilized to provide component treatments. The addition of various components as discussed herein provides a novel and inventive retrofit system and/or method, which provides improved treatment efficiency at a relatively low cost. Accordingly, the need for a cost-prohibitive multiple-robotic arm system is eliminated.

Treatments in accordance with the present disclosure may be performed on one or more components 10, such as on the exterior surface 11 thereof. A component 10 can, in some embodiments, be one of a variety of specific components, such as those utilized in high temperature applications (e.g., components comprising nickel or cobalt based superalloys). In some embodiments, the component 10 may be an industrial gas turbine or steam turbine component, such as a combustion component or a hot gas path component. In some embodiments, the component 10 may comprise a turbine blade, compressor blade, vane, nozzle, shroud, rotor, combustor liner, transition piece, or casing. In other embodiments, the component 10 may comprise any other component of a gas turbine, a steam turbine, a boiler, or the like. In other embodiments, the component may comprise a non-turbine component including, but not limited to, automotive components (e.g., for cars, trucks, etc.), aerospace components (e.g., for airplanes, helicopters, space shuttles, etc.), locomotive or rail components (e.g., for trains, train tracks, etc.), structural, infrastructure or civil engineering components (e.g., for bridges, buildings, construction equipment, etc.), and/or power plant or chemical processing components (e.g., for pipes used in high temperature applications).

In some embodiments, the treatment provided to a component 10 may be a thermal spraying treatment, and the tool 20 utilize to perform such treatment may be a thermal spraying tool such as a thermal spray gun. Exemplary thermal spray techniques and tools include plasma spraying by a plasma spray gun and/or coating with high velocity oxygen fuel ("HVOF") using an HVOF coating spray gun. Other suitable thermal spraying techniques and tools include wire arc spraying by a wire arc spray gun, cold spraying by a cold spray gun, warm spraying by a warm spray gun, etc.

It should be understood, however, that treatment in accordance with the present disclosure is not limited to thermal spraying and that other suitable treatments may be provided. For example, in one embodiment, the treatment may be welding, and the tool 20 may be welding tool.

A treatment in accordance with the present disclosure may include the application of one or more materials to the tool 20 and/or through the tool 20 to the component 10. For example, in some embodiments, a gas may be provided. Suitable gases include, for example, one or more of oxygen, hydrogen, argon, helium, methane, propane, propylene, acetylene, natural gas and/or other suitable gases. Additionally, or alternatively, one or more substrates may be provided. Substrates may, in exemplary embodiments, be provided in powder form. Suitable substrates include suitable metals and/or ceramics, such as nickel, tungsten carbide, chromium carbide, MCrAlY, alumina, and/or stainless steel.

In the specific application of providing a thermal barrier coating (such as on a high temperature component), a first treatment using a first tool may be the application of a nickel-based bond coat along with argon, nitrogen, or hydrogen gas using a first plasma spray gun, and a second treatment using a second tool may be the application of a ceramic outer coat along with argon, nitrogen, or hydrogen gas using a second plasma spray gun. In another specific application, an HVOF treatment may be applied to a component (such as a high temperature component). This third treatment using a third tool may be the application of a suitable bond coat along with argon, nitrogen, or hydrogen gas using a third HVOF spray gun.

Each tool 20 in accordance with the present disclosure may be removably connectable to a robotic arm 50. For example, robotic arm 50 may include a tool mount 52, such as a gripper, magnetic plate, or other suitable mounting apparatus, on an end thereof which can hold and support a tool 20. The robotic arm 50 may, during operation, be capable of connecting to a specific tool 20' for utilization during a specific treatment of a component 10. The robotic arm 50 may, during operation, further be capable of disconnecting from the specific tool 20' after the treatment is complete. Still further, the robotic arm 50 may, during operation, be capable of connecting to another specific tool 20" for utilization during another specific treatment of a component 10. Still further, the robotic arm 50 may, during operation, further be capable of disconnecting from the other specific tool 20" after treatment is complete.

The tool(s) 20 may be supported on a tool change support 30, and the robotic arm 50 may be capable of interacting with the tool change support 30 during connection with and/or disconnection from tool(s) 20, such that the tools are retrieved from the tool change support 30 for use and are returned to the tool change support 30 after use.

The robotic arm 50 (including the tool mount 52) may move within a predetermined coordinate system. The predetermined coordinate system may include an X-axis, a Y-axis, and a Z-axis, which are mutually orthogonal. The arm 50 may move along and/or about one or more of the axes, and in exemplary embodiments is a six-degree of freedom robotic arm capable of movement along and about all three axes. Robotic arm 50 may include an input/output module 54 (shown in FIG. 3), which facilitates communication with other components, such as a main controller, as discussed herein.

A robotic treatment system 100 in accordance with the present disclosure may include a robotic arm 50 and a plurality of tools 20 (including for example tool 20' and tool 20"). Each tool 20 may be configured to utilize one or more different gases and/or substrates, as discussed herein. For example, the one or more different gases and/or substrates may be selectively flowed to the tool(s) 20, as discussed herein.

A robotic treatment system 100 may further include a distribution assembly 110, which generally provides a distribution flow to each tool 20. The distribution flow may include a power flow to power the tool 20 and/or a cooling fluid flow (in exemplary embodiments, water) to cool the tool 20. Distribution assembly 110 may, for example, include a distribution source 112. The distribution source 112 may be the source of the distribution flow to and from the tool(s) 20. For example, distribution source 112 may include various connectors, electrical components, and/or plumbing components to supply and receive power and/or cooling fluid.

In embodiments in which the distribution flow includes power, distribution assembly 110 may further include a rectifier 114. Rectifier 114 may be in communication with the distribution source 112, via suitable electric components such as electrical cables. The rectifier 114 may convert alternating current into direct current and provide the direct current to the distribution source 112 for utilization in system 100. Additionally, or alternatively, in embodiments in which the distribution flow includes cooling fluid, distribution assembly 110 may further include a heat exchanger 116. Heat exchanger 116 may be in communication with the distribution source 112, via suitable plumbing components such as piping. The heat exchanger 116 may cool fluid flowing therethrough and provide the cooled fluid to the distribution source 112 for utilization in system 100.

Distribution assembly 110 may further include one or more distribution feed cables 120 and one or more distribution return cables 122. A distribution feed cable 120 may, for example, be in communication between distribution source 112 and one or more tools 20, such as tool 20' and tool 20" shown in FIG. 2. Accordingly, distribution flow (such as positive electrical charge and/or cooling fluid) may be provided to tools 20 from distribution source 112 through a distribution feed cable 120. A distribution return cable 122 may, for example, be in communication between distribution source 112 and one or more tools 20, such as in exemplary embodiments a plurality of tools 20. Accordingly, distribution flow (such as negative electrical charge and/or cooling fluid) may be provided from tools 20 to distribution source 112 through a distribution return cable 122.

Distribution assembly 110 may further include one or more distribution valves 124, which may be pneumatic valves or other suitable valves. Each valve 124 may be coupled to the distribution feed cable 122 or distribution return cable 124. Each valve 124 may regulate the distribution flow through the associated cable, either through the distribution feed cable 120 to one of the plurality of tools 20 or through the distribution return cable 122 from one of the plurality of tools 20. Notably, in exemplary embodiments, each valve 124 may be associated with either the distribution feed cable 120 or distribution return cable 122, and may further be associated with only a single tool 20, such that the valves 124' regulate distribution flow to or from tool 20' and the valves 124" regulate distribution flow to or from tool 20".

Figure 2:
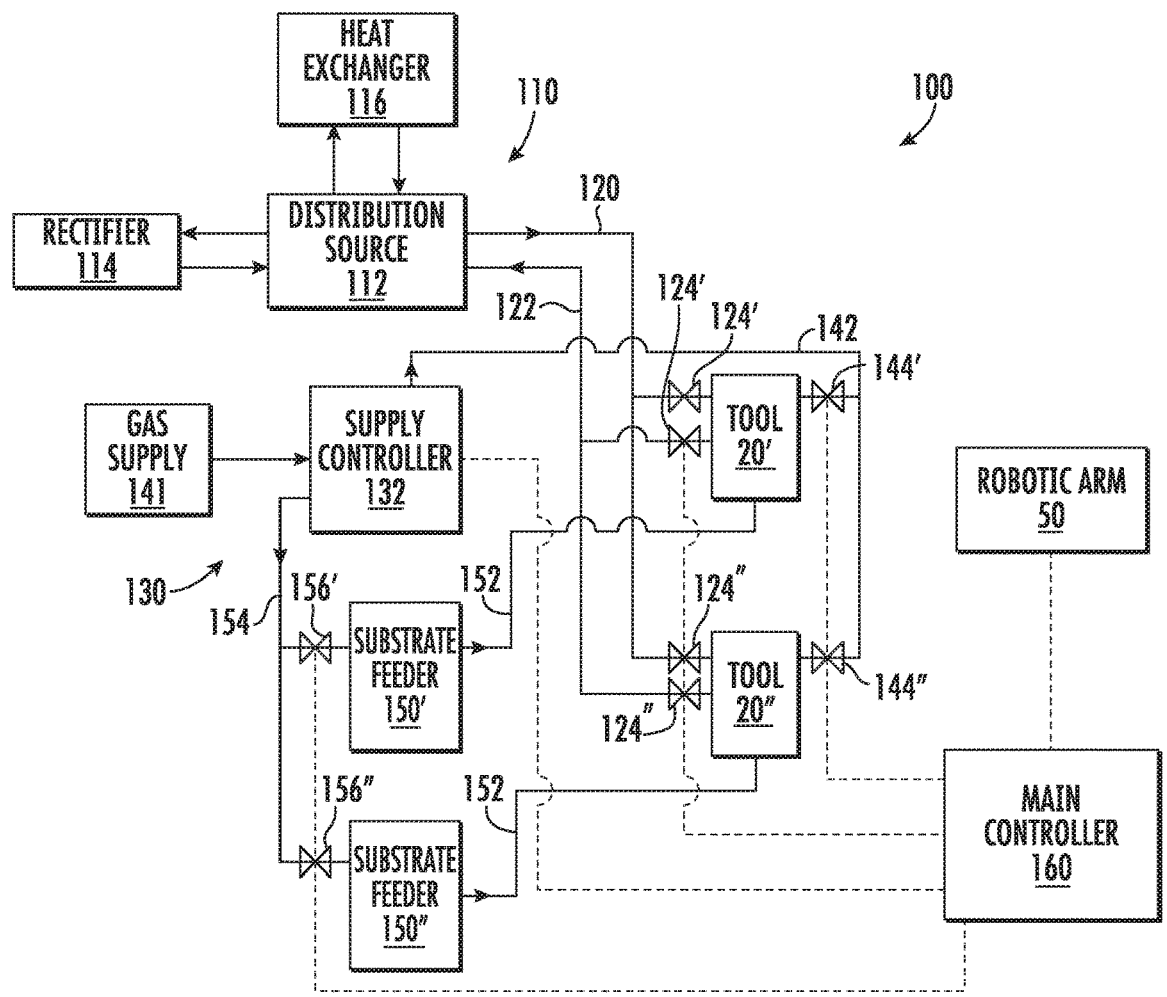
FIG. 2 is a schematic illustration of a robotic treatment system in accordance with embodiments of the present disclosure.
Figure 3:
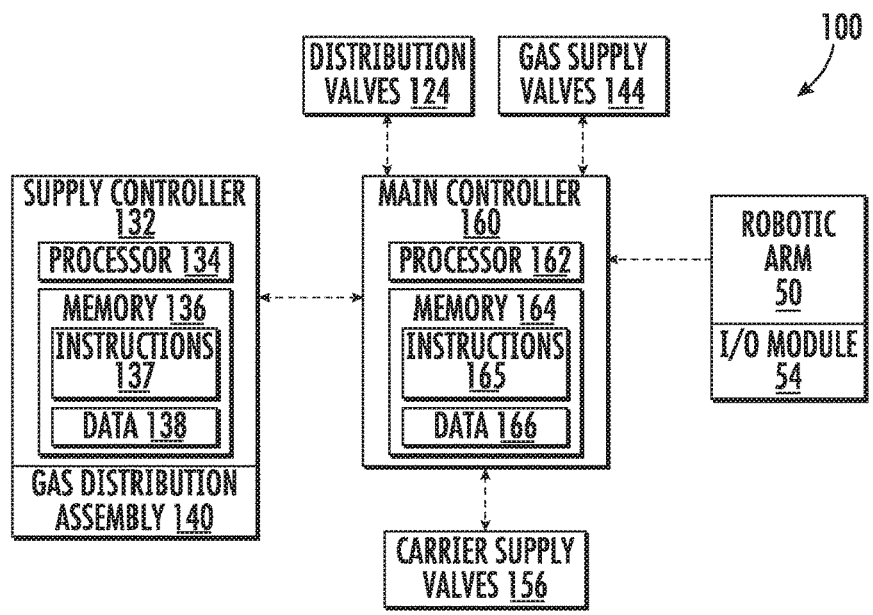
FIG. 3 is a schematic illustration of various components of a robotic treatment system in accordance with embodiments of the present disclosure.

It should be understood that the cables 120, 122 may include splitters and other suitable components as necessary to provide the distribution flow to and from the various individual tools 20 as discussed herein. While FIG. 2 illustrates two exemplary tools 20', 20", it should be understood that these tools 20', 20" may be representative of a plurality of tools 20, including more than the two tools 20', 20" that are illustrated.

System 100 may further include a supply assembly 130, which generally provides a treatment supply flow to the tools 20 for use by the tools 20 in providing a treatment to components 10. The treatment supply flow may be provided in one or more forms via one or more separate flows, examples of which may be a gas, a substrate carried by a gas, and/or a substrate. The supply assembly 130 includes a supply controller 132 and a gas distribution assembly 140, as discussed below.

Supply controller 132 may be in operable communication with, and thus control operation of, various other components of the supply assembly 130 to provide necessary treatment supply flows, such as a gas from a gas supply 141 and/or one or more substrates from substrate feeders 150, as discussed herein. The supply controller 132 can include one or more processors 134 and one or more memory devices 136. Supply controller 132 may further include, for example, a network interface to communicate over a network. The network interface can include any suitable components for interfacing with one more networks or components as discussed herein, including, for example, transmitters, receivers, ports, controllers, antennas, or other suitable components. The network can include a data bus or a combination of wired and/or wireless communication links. The network can be any type of communications network, such as a local area network (e.g. intranet), wide area network (e.g. Internet), cellular network, or some combination thereof.

The one or more processors 134 can include any suitable processing device, such as a microprocessor, microcontroller, integrated circuit, logic device, or other suitable processing device. The one or more memory devices 136 can include one or more computer-readable media, including, but not limited to, non-transitory computer-readable media, RAM, ROM, hard drives, flash drives, or other memory devices. The one or more memory devices 136 can store information accessible by the one or more processors 134, including computer-readable instructions 137 that can be executed by the one or more processors 134. The instructions can be any set of instructions that when executed by the one or more processors 134, cause the one or more processors 134 to perform operations.

The one or more memory devices 136 can also store data 138 that can be retrieved, manipulated, created, or stored by the one or more processors 134. The data can be stored in one or more databases. The one or more databases can be connected to the supply controller 132 by a high bandwidth LAN or WAN, or can also be connected to the supply controller 132 through another type of network. The one or more databases can be split up so that they are located in multiple locales.

Supply assembly 130 may further include, for example, a gas distribution assembly 140. The gas distribution assembly 140 may include suitable components, such as pipes, manifolds, valves, etc., to distribute gas as necessary for one or more treatment supply flows. In exemplary embodiments, one or more gas supplies 141 may supply one or more gases to the supply controller 132 and the associated gas distribution assembly 140.

One or more gas supply cables 142 may provide flow communication between the gas distribution assembly 140 and one or more tools 20, such as the plurality of tools 20 present in exemplary embodiments described herein. Accordingly, a gas supply flow may be provided to tools 20 (e.g., to tool 20' and to tool 20") from supply assembly 130 (such as via the gas distribution assembly 140 thereof) through gas supply cable 142, as controlled by supply controller 132.

Supply assembly 130 may further include one or more gas supply valves 144, which may be pneumatic valves or other suitable valves. Each valve 144 may be coupled to a gas supply cable 142. Each valve 144 may regulate the gas supply flow through the cable 142 to one of the plurality of tools 20. Notably, in exemplary embodiment shown in FIG. 2, each valve 144 may be associated with only a single tool 20, such that a first valve 144' regulates gas supply flow to a first tool 20', and a second valve 144" regulates gas supply flow to a second tool 20".

It should be understood that a cable 142 may include splitters and other suitable components as necessary to provide the gas supply flow to the various individual tools 20 as discussed herein.

In some embodiments, supply assembly 130 may further include one or more substrate feeders 150. Each substrate feeder 150 may house a substrate, as discussed herein. In some embodiments, a plurality of substrate feeders 150 may be utilized, and in some embodiments, each substrate feeder 150 may house a different substrate from others of the plurality of substrate feeders 150. Alternatively, one or more of the plurality of substrate feeders 150 may house the same substrate, yet be connected to different components as discussed herein.

In some embodiments, supply assembly 130 may further include one or more supply feed cables 152. Each supply feed cable 152 may be in communication between a substrate feeder 150 and one of the plurality of tools 20. Accordingly, a supply feed flow may be provided to a first tool 20' from an associated substrate feeder 150' through the associated supply feed cable 152, while supply feed flow may be provided to a second tool 20" from a second feeder 150" through an associated supply feed cable 152.

In some embodiments, supply assembly 130 may further include one or more carrier supply cables 154 in communication between the supply controller 132 (such as the supply assembly 140) and one or more substrate feeders 150. Accordingly, a carrier supply flow may be provided to substrate feeders 150 from supply controller 132 (such as via the associated supply assembly 140) through one or more carrier supply cables 154.

Supply assembly 130 may further include one or more carrier supply valves 156, which may be pneumatic valves or other suitable valves. Each valve 156 may be coupled to a carrier supply cable 154. Each valve 156 may regulate the carrier supply flow (which may be a gas from the supply assembly 140 associated with supply controller 132) through the cable 154 to one of the plurality of substrate feeders 150. Notably, in exemplary embodiments, each valve 156', 156" may be associated with only a single substrate feeder 150', 150", such that the valve 156', 156" regulates carrier supply flow to that one substrate feeder 150', 150".

It should be understood that a cable 154 may include splitters and other suitable components as necessary to provide the carrier supply flow to the various individual substrate feeders 150 as discussed herein.

It should also be understood that, when carrier supply cables 154 and valves 156 are utilized, the supply feed flow may include a substrate and a carrier gas. More specifically, the carrier supply flow may become part of the supply feed flow by mixing with the substrate in the substrate feeder 150.

In exemplary embodiments, system 100 may further include a main controller 160. The main controller 160 may be in operable communication with, and thus generally control operation of, the system 100, including, for example, operation of the robotic arm 50, the supply controller 132, distribution valves 124, gas supply valves 144, substrate feeders 150, carrier supply valves 156, and/or distribution assembly 110. In exemplary embodiments, main controller 160 may be in operable communication with the robotic arm 50, the supply controller 132, and, optionally, the distribution valves 124, gas supply valves 144, and/or carrier supply valves 156.

Main controller 160 can include one or more processors 162 and one or more memory devices 164. Main controller 160 may further include, for example, a network interface to communicate over a network. The network interface can include any suitable components for interfacing with one more networks or components as discussed herein, including, for example, transmitters, receivers, ports, controllers, antennas, or other suitable components. The network can include a data bus or a combination of wired and/or wireless communication links. The network can be any type of communications network, such as a local area network (e.g. intranet), wide area network (e.g. Internet), cellular network, or some combination thereof.

The one or more processors 162 can include any suitable processing device, such as a microprocessor, microcontroller, integrated circuit, logic device, or other suitable processing device. The one or more memory devices 164 can include one or more computer-readable media, including, but not limited to, non-transitory computer-readable media, RAM, ROM, hard drives, flash drives, or other memory devices. The one or more memory devices 164 can store information accessible by the one or more processors 162, including computer-readable instructions 165 that can be executed by the one or more processors 162. The instructions 165 can be any set of instructions that when executed by the one or more processors 162, cause the one or more processors 162 to perform operations.

The one or more memory devices 164 can also store data 166 that can be retrieved, manipulated, created, or stored by the one or more processors 162. The data can be stored in one or more databases. The one or more databases can be connected to the main controller 160 by a high bandwidth local area network ("LAN") or wide area network ("WAN"), or can also be connected to the main controller 160 through another type of network. The one or more databases can be split up so that they are located in multiple locales.

In exemplary embodiments, various components of the system 100 may be retrofit existing robotic treatment systems. Accordingly, the components described herein can advantageously be provided to existing components (e.g., robotic arms) in an existing system in order to form system 100 which provides the advantages discussed herein. For example, in some embodiments, main controller 160 may be a retrofit component. Further, in some embodiments, distribution valves 124, gas supply valves 144, and/or carrier supply valves 156 may be retrofit components.

As discussed, main controller 160 may be operable to control various other components of the system 100. As discussed, the present disclosure is further directed to methods 200 for providing automated treatment of a component 10. In exemplary embodiments, systems 100 (and/or various components thereof) may facilitate such methods. Accordingly, main controller 160 may be operable to perform the various method steps as discussed herein.

Figure 4:
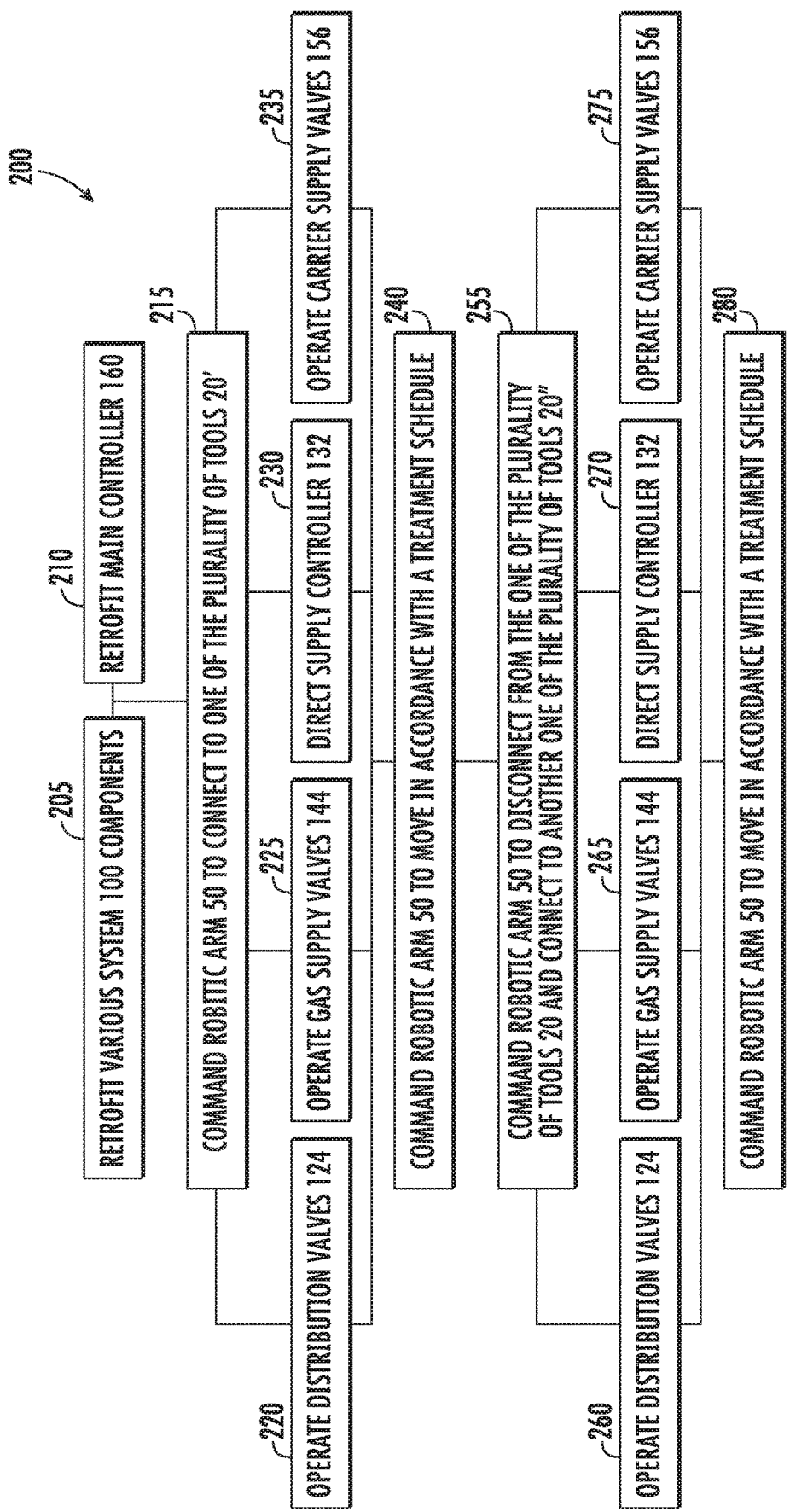
FIG. 4 is a flow chart illustrating a method for providing automated component treatment in accordance with embodiments of the present disclosure.

As shown in FIG. 4, a method 200 in accordance with the present disclosure may include the step 205 of retrofitting the plurality of distribution valves 124 to the distribution feed cable(s) 120 and distribution return cable(s) 122, retrofitting the plurality of gas supply valves 144 to the gas supply cable 142, and/or retrofitting the plurality of carrier supply valves 156 to the carrier supply cable 154, as discussed herein. A method in accordance with the present disclosure may further include the step 210 of retrofitting connection of the main controller 160 to the robotic arm 50, the plurality of distribution valves 124, the plurality of gas supply valves 144, the plurality of carrier supply valves 156, and/or the supply controller 132 such that the main controller 160 is in operable communication with the robotic arm 50, the plurality of distribution valves 124, the plurality of gas supply valves 144, the plurality of carrier supply valves 156, and/or the supply controller 132, as discussed herein.

A method 200 in accordance with the present disclosure may include, and/or the main controller 160 may be operable to perform, the step 215 of commanding the robotic arm 50 to connect (such as by using the tool mount 52) to one of the plurality of tools 20'.

A method 200 in accordance with the present disclosure may further include, and/or the main controller 160 may be operable to perform, the step 220 of operating one or more distribution valves 124, such as by opening or closing the valves 124 as necessary, such that only the ones of the plurality of distribution valves 124' in communication with the one of the plurality of tools 20' to which the robotic arm 50 is connected are open. Accordingly, a distribution flow may be provided to and from only the tool 20' to which the robotic arm 50 is connected.

A method 200 in accordance with the present disclosure may further include, and/or the main controller 160 may be operable to perform, the step 225 of operating one or more of the plurality of gas supply valves 144, such as by opening or closing the valves 144 as necessary, such that only the one of the plurality of gas supply valves 144' in communication with the one of the plurality of tools 20' to which the robotic arm 50 is connected are open. Accordingly, a gas supply flow may be provided to only the tool 20' to which the robotic arm 50 is connected.

A method 200 in accordance with the present disclosure may further include, and/or the main controller 160 may be operable to perform, the step 230 of directing the supply controller 132 to provide a supply feed flow through only the one of the plurality of supply feed cables 152 which is in communication with the one of the plurality of tools 20' to which the robotic arm 50 is connected. Accordingly, a supply feed flow may be provided to only that tool 20' to which the robotic arm 50 is connected.

A method 200 in accordance with the present disclosure may further include, and/or the main controller 160 may be operable to perform, the step 235 of operating one or more of the plurality of carrier supply valves 156, such as by opening or closing the valves 156 as necessary, such that only the one of the plurality of carrier supply valves 156' in communication with one of the plurality of substrate feeders 150' is open. Notably, in exemplary embodiments, the one of the plurality of substrate feeders 150' may be the one in communication with the one of the plurality of tools 20' to which the robotic arm 50 is connected. Accordingly, a carrier supply flow may be provided to the one of the plurality of substrate feeders 150', and this carrier supply flow may become part of the supply feed flow that is provided to only that tool 20' to which the robotic arm 50 is connected.

A method 200 in accordance with the present disclosure may further include, and/or the main controller 160 may be operable to perform, the step 240 of commanding the robotic arm 50 to move in accordance with a treatment schedule for the component 10, the treatment schedule corresponding to the one of the plurality of tools 20' to which the robotic arm is connected. The treatment schedule may, for example, be stored in the main controller 160. The treatment schedule may include various calibration movements by the robotic arm 50, treatment application movements by the robotic arm 50, and application of treatment materials (such as substrates, gases, and mixtures thereof), such as may be supplied to the tool 20' via various cables 142, 152 as discussed herein.

Methods 200 and main controllers 160 in accordance with the present disclosure may further facilitate automated switching to new tools, which may utilize the same or different treatment materials (such as substrates, gases, and mixtures thereof), for application to the same or a different component 10. For example, a method 200 in accordance with the present disclosure may include, and/or the main controller 160 may be operable to perform, the step 255 of commanding the robotic arm 50 to disconnect from the one of the plurality of tools 20' and connect (such as by using the tool mount 52) to another one of the plurality of tools 20".

A method 200 in accordance with the present disclosure may further include, and/or the main controller 160 may be operable to perform, the step 260 of operating one or more distribution valves 124, such as by opening or closing the valves 124 as necessary, such that only the ones of the plurality of distribution valves 124" in communication with the other one of the plurality of tools 20" to which the robotic arm 50 is connected are open. Accordingly, a distribution flow may be provided to and from only the tool 20" to which the robotic arm 50 is connected.

A method 200 in accordance with the present disclosure may further include, and/or the main controller 160 may be operable to perform, the step 265 of operating one or more of the plurality of gas supply valves 144, such as by opening or closing the valves 144 as necessary, such that only the one of the plurality of gas supply valves 144" in communication with the other one of the plurality of tools 20" to which the robotic arm 50 is connected are open. Accordingly, a gas supply flow may be provided to only the tool 20" to which the robotic arm 50 is connected.

A method 200 in accordance with the present disclosure may further include, and/or the main controller 160 may be operable to perform, the step 270 of directing the supply controller 132 to provide a supply feed flow through only the one of the plurality of supply feed cables 152 which is in communication with the other one of the plurality of tools 20" to which the robotic arm 50 is connected. Accordingly, a supply feed flow may be provided to only that tool 20" to which the robotic arm 50 is connected.

A method 200 in accordance with the present disclosure may further include, and/or the main controller 160 may be operable to perform, the step 275 of operating one or more of the plurality of carrier supply valves 156, such as by opening or closing the valves 156 as necessary, such that only the one of the plurality of carrier supply valves 156" in communication with one of the plurality of substrate feeders 150" is open. Notably, in exemplary embodiments, the one of the plurality of substrate feeders 150" may be the one in communication with the other one of the plurality of tools 20" to which the robotic arm 50 is connected. Accordingly, a carrier supply flow may be provided to the one of the plurality of substrate feeders 150", and this carrier supply flow may become part of the supply feed flow which is provided to only that tool 20" to which the robotic arm 50 is connected.

A method 200 in accordance with the present disclosure may further include, and/or the main controller 160 may be operable to perform, the step 280 of commanding the robotic arm 50 to move in accordance with a treatment schedule for the component 10, the treatment schedule corresponding to the other one of the plurality of tools 20" to which the robotic arm is connected. The treatment schedule may, for example, be stored in the main controller 160. The treatment schedule may include various calibration movements by the robotic arm 50, treatment application movements by the robotic arm 50, and application of treatment materials (such as substrates, gases, and mixtures thereof), such as may be supplied to the other tool 20" by various cables 142, 152 as discussed herein.

It should be understood that the one or more of the gas supply flow, carrier supply flow, and/or supply feed flow provided through the various cables to one tool 20' as discussed herein may the same or different from the gas supply flow, carrier supply flow, and/or supply feed flow provided through the various cables to another tool 20" as discussed herein. The treatment schedules for the first tool 20' may be the same as, or different from, the treatment schedules for the second tool 20".

The technology discussed herein makes reference to computer-based systems, as well as, actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A robotic treatment system, comprising:
   a robotic arm comprising a tool mount;
   a plurality of tools, each of the plurality of tools removably connectable to the tool mount, wherein at least one of the plurality of tools is a plasma spray gun or a high velocity oxygen fuel ("HVOF") gun;
   a distribution assembly comprising a distribution source, a distribution feed cable, a distribution return cable, and a plurality of distribution valves, each of the distribution feed cable and distribution return cable in communication between the distribution source and each of the plurality of tools, each of the plurality of distribution valves regulating a distribution flow through the distribution feed cable to one of the plurality of tools or the distribution return cable from one of the plurality of tools;
   a supply assembly comprising a supply controller, a plurality of substrate feeders, and a plurality of supply feed cables, each of the plurality of supply feed cables in communication between one of the plurality of substrate feeders and one of the plurality of tools; and
   a main controller, the main controller in operable communication with the robotic arm, the supply controller, and each of the plurality of distribution valves.

2. The system of claim 1, wherein the supply assembly further comprises a gas supply in communication with the supply controller, and a gas supply cable in communication between the supply controller and each of the plurality of tools.

3. The system of claim 2, further comprising a plurality of gas supply valves, each of the plurality of gas supply valves regulating a gas supply flow through the gas supply cable from the supply controller to one of the plurality of tools, and wherein the main controller is in operable communication with each of the plurality of gas supply valves.

4. The system of claim 1, wherein the supply assembly further comprises a gas supply in communication with the supply controller, and a carrier supply cable in communication between the supply controller and each of the plurality of substrate feeders.

5. The system of claim 4, further comprising a plurality of carrier supply valves, each of the plurality of carrier supply valves regulating a carrier supply flow through the carrier supply cable from the supply controller to one of the plurality of substrate feeders, and wherein the main controller is in operable communication with each of the plurality of carrier supply valves.

6. The system of claim 1, wherein the main controller is operable to:
   command the robotic arm to connect to one of the plurality of tools using the tool mount;
   operate one or more of the plurality of distribution valves such that only the ones of the plurality of distribution valves in communication with the one of the plurality of tools are open; and
   direct the supply controller to provide a supply feed flow through only the one of the plurality of supply feed cables which is in communication with the one of the plurality of tools.

7. The system of claim 6, wherein the main controller is further operable to:
   command the robotic arm to disconnect from the one of the plurality of tools and connect to another one of the plurality of tools using the tool mount;
   operate one or more of the distribution valves such that only the ones of the plurality of distribution valves in communication with the other one of the plurality of tools are open; and
   direct the supply controller to provide a supply feed flow through only the one of the plurality of supply feed cables which is in communication with the other one of the plurality of tools.

8. The system of claim 1, wherein each of the plurality of substrate feeders houses a different substrate from others of the plurality of substrate feeders.

9. The system of claim 1, wherein the main controller and the plurality of distribution valves are retrofit components.

10. The system of claim 1, wherein the distribution flow comprises a power fluid, and wherein the distribution assembly further comprises a rectifier in communication with the distribution source for converting alternating current into direct current and providing direct current to the distribution source.

11. The system of claim 1, wherein the distribution flow comprises a cooling fluid, wherein the distribution assembly further comprises a heat exchanger for cooling fluid flowing therethrough and providing the fluid to the distribution source.

12. A method for providing automated component treatment, the method comprising:
- commanding, with a main controller, a robotic arm to connect to one of a plurality of tools, wherein at least one of the plurality of tools is a plasma spray gun or a high velocity oxygen fuel ("HVOF") gun;
- operating, with the main controller, one or more of a plurality of distribution valves such that only the ones of the plurality of distribution valves in communication with the one of the plurality of tools are open, wherein each of the plurality of distribution valves regulates a distribution flow through a distribution feed cable from a distribution source to one of the plurality of tools or through a distribution return cable from one of the plurality of tools to the distribution source;
- directing, with the main controller, a supply controller to provide a supply feed flow through only one of a plurality of supply feed cables, the one of the plurality of supply feed cables in communication with the one of the plurality of tools;
- commanding, with the main controller, the robotic arm to disconnect from the one of the plurality of tools and connect to another one of the plurality of tools;
- operating, with the main controller, one or more of the distribution valves such that only the ones of the plurality of distribution valves in communication with the other one of the plurality of tools are open; and
- directing, with the main controller, the supply controller to provide a supply feed flow through only the one of the plurality of supply feed cables which is in communication with the other one of the plurality of tools.

13. The method of claim 12, further comprising:
- operating, with the main controller, one or more of a plurality of gas supply valves such that only the one of the plurality of gas supply valves in communication with the one of the plurality of tools is open when the one of the plurality of tools is connected to the robotic arm, wherein each of the plurality of gas supply valves regulates a gas supply flow through a gas supply cable to one of the plurality of tools; and
- operating, with the main controller, one or more of the plurality of gas supply valves such that only the one of the plurality of gas supply valves in communication with the other one of the plurality of tools is open when the other one of the plurality of tools is connected to the robotic arm.

14. The method of claim 12, further comprising:
- operating, with the main controller, one or more of a plurality of carrier supply valves such that only the one of the plurality of carrier supply valves in communication with one of a plurality of substrate feeders is open when the one of a plurality of tools is connected to the robotic arm, wherein each of the plurality of carrier supply valves regulates a carrier supply flow through a carrier supply cable to one of the plurality of substrate feeders; and
- operating, with the main controller, one or more of a plurality of carrier supply valves such that only the one of the plurality of carrier supply valves in communication with another one of the plurality of substrate feeders is open when the other one of the plurality of tools is connected to the robotic arm.

15. The method of claim 12, further comprising:
- retrofitting the plurality of distribution valves to the distribution feed cable and distribution return cable; and
- retrofitting connection of the main controller to the robotic arm, the plurality of distribution valves, and the supply controller such that the main controller is in operable communication with the robotic arm, the plurality of distribution valves, and the supply controller.

16. The method of claim 12, further comprising:
- commanding, with a main controller, the robotic arm to move in accordance with a treatment schedule for the component, the treatment schedule corresponding to the one of the plurality of tools when the one of the plurality of tools is connected to the robotic arm; and
- commanding, with the main controller, the robotic arm to move in accordance with another treatment schedule for the component, the treatment schedule corresponding to the other one of the plurality of tools when the other one of the plurality of tools is connected to the robotic arm.

17. The method of claim 12, wherein the supply feed flow provided through the one of the plurality of supply feed cables which is in communication with the one of the plurality of tools is different from the supply feed flow provided through the one of the plurality of supply feed cables which is in communication with the other one of the plurality of tools.

18. The method of claim 12, wherein the distribution flow comprises at least one of power or cooling fluid.

19. The method of claim 12, wherein the supply controller is in communication with a gas supply.

* * * * *